Patented Oct. 12, 1948

2,450,952

UNITED STATES PATENT OFFICE 2,450,952

PHOSPHATE CEMENTS

Herbert H. Greger, Washington, D. C.

No Drawing. Application January 6, 1945,
Serial No. 571,672

5 Claims. (Cl. 106—121)

This invention relates to inorganic adhesive compositions capable of hardening or solidifying from a liquid or pasty consistency essentially by chemical action.

Compositions of this type have been known in the past in various forms. The most well known type is the dental cement which is based on reactions of phosphoric acid with various metallic compounds, such as oxides, silicates and phosphates.

These dental cements have considerable value and utility, but for certain reasons they are not adapted in their present form for large scale industrial, domestic or other use. The ingredients are highly specialized and refined and consequently expensive. Furthermore, the present dental cement is marketed in two packages, one containing a powder and the other is usually a solution of a metallic phosphate in syrupy phosphoric acid. The packaging problem and the problems of storage and shipment, the merchandising problems in the various channels of the trade, and also the problems of storage and safety in handling of such a corrosive liquid as phosphoric acid for the consuming public make it rather difficult, if not impossible, to put such a composition into the hands of the general public except for a few well trained individuals or specialists.

For purposes of marketing on a broad basis, cements of this type and compositions containing them must be made considerably more foolproof, cheaper and simpler to handle. This invention is concerned with improvements for overcoming these objections.

One of the objects of this invention is the production of a chemical composition in the form of a dry powder that, upon the addition of water, will form a chemically hardening cement accompanied by a hydraulic action.

A further object of the invention is the production of such a composition from an acidic water soluble, colloidal, solid aluminum phosphate.

Another object of this invention is the combination of this solid aluminum phosphate with other solids which have the ability of reacting with the acidic aluminum phosphate and cause the mass to harden after addition of water.

Still another object of the invention is the production of a cement that may be mixed and used with a minimum hazard to its user.

One other object is the production of a cement-like adhesive containing suitable pigments for the production of an inorganic paint.

A still further object of the invention is an adhesive of high heat stability.

With these and other objects in view, the present invention resides as hereinbefore indicated, in a new cementitious composition of considerable utility.

The principal concept of this invention is the introduction of the phosphoric acid radical in the form of a water soluble colloidal aluminum phosphate. In solid form this phosphate does not react with the other solid ingredients of the mixture unless water is added. The result is that the dry cement mixture is stable and can be packaged in the form of a powder in a single container. Furthermore, the aluminum phosphate, although it retains excellent reactivity, is in no way dangerous and may be handled by inexperienced persons in factories or homes.

The result of these improvements is a wide utility in fields where the combination of adhesiveness and drying action or hardening are needed, such as in the field of inorganic adhesives or cements, in the field of inorganic paint vehicles and the like. The drying action must be accompanied by a hydraulic action which causes the absorption of all water by hydration rather than evaporation.

In accordance with this invention, a cement is provided one of the important ingredients of which is a solid, water-soluble aluminum phosphate. Aluminum phosphates of this type are described in my Patent No. 2,405,884, issued August 13, 1946, on my copending application Serial No. 494,526, filed July 13, 1943.

They are colloidal, hydrated, acid aluminum phosphates and their composition varies between the mono- and the di-aluminum phosphate. These compounds can be obtained in solid, hydrated form by suitable methods of production, either by direct reaction of the ingredients or by evaporating a portion of the water from their solutions. In the manufacture of these compounds, the proper control of water content and temperature is of the utmost importance to keep the water soluble properties.

Chemically these phosphates are very reactive with substances of a basic nature. The reaction, however, proceeds only if water is present or if the phosphate is present in liquid form. I have found that the reaction does not proceed if both the phosphate and the base are present in dry solid form. Even if both are very finely divided, their mixture, when dry, will store without deterioration.

It will be understood that a suitable selection must be made among the basic substances. Good results were obtained with compounds of the second group of elements in the periodic system, and also with lead, copper, iron, titanium and zirconium compounds. Among these, some give better results than other, as will be shown later.

When an aluminum phosphate reacts with basic compounds the rate of the reaction varies considerably and depends largely on chemical composition. The most desirable rate of reaction is a compromise between rapid completion of the set and sufficient time for handling of the material. A flash set is usually accompanied by the evolution of a considerable amount of heat which in turn accelerates the set. Finely divided magnesium oxide or periclase, for instance, will set, sometimes, so rapidly that the mass is hardened before mixing is completed.

In contrast to this flash set certain other substances, such as olivine, or other magnesium silicates, react rather slowly with the aluminum phosphate and it may take from 12 to 24 hours before the mass has fully hardened.

These examples of the magnesium oxide and silicate illustrate the reaction also in some other respects. A cement of the type here described must become inert to water after it has fully set and this is usually obtained by full saturation of the phosphate radical with the base. Such saturation, however, is not always readily produced. While the first hydrogen of the phosphoric acid is chemically very active, the second is less and the third is still considerably less active than the second. Therefore, if the aluminum phosphate is reacted with magnesium oxide, this substance, being very active chemically, will cause the desired saturation of the phosphate radical and may even form basic magnesium phosphate. In the case of the magnesium silicate the corresponding set develops much more slowly, sometimes a period of days is needed. During the more active stages of the reaction the most reactive portions of the silicate are used up first. The remainder or the less active portion may be difficult to react with the as yet unsaturated part of the phosphate radical. Large variations in grain sizes or mineralogical non-uniformity will tend to cause such a situation.

The gelatinous silicic acid which forms by the acid decomposition of the magnesium ortho silicate will tend to retard the setting reaction by its presence on the grain. The end result after the set is complete may be a very complicated mixture of complex compounds consisting of aluminum, magnesium and silicon phosphates. The development or application of heat has, however, a very profound influence on the whole set. It affects not only the rate of the set but also the type of compounds that are formed.

The cement of the present invention is mixed with water for dissolving the phosphate and producing workability. The water must subsequently become absorbed in the solidifying cement body by chemical hydration. Its elimination by evaporation is not relied on. It will, therefore, be obvious that, for best results, the amount of water that can be applied in preparing the cement is limited.

For practical reasons, however, the water content must be large enough to give good workability to the cement, good spread, and in some cases even a pouring consistency which may be desired. While the water content of the mixture is usually not critical, it is a natural requirement that the amount of water for plasticization should be less than the amount that can be readily absorbed by hydration of the setting cement.

Closely related to the water content is further the adhesiveness of the cement, its final strength, density and tendency to shrink. Within the limits of good workability the density and strength is usually better when less water is applied. Full density is needed in the majority of applications and the tightness with which the water is bound in the hardened cement will in a large measure determine the amount of pores which may tend to form. In this connection it is also of interest to consider the rule that the water of hydration in a solid body is more tightly held when less of such water is present.

It seems unnecessary to note that these factors and variables have to be dealt with in most any cements. In some of these compositions a certain number of the variables are usually taken care of by natural properties. In many cases, however, such physical factors as temperature and time can be adjusted by mechanical means. A very quick setting cement, for instance, could be applied by a cement gun which mixes the water with the cement in the nozzle of the gun.

The ideal filler that will give a slow initial set but a fast afterset, is one which is relatively inactive in the early stages of the reaction but becomes more active as the set proceeds and the phosphate becomes saturated. This is, however, a distinctly artificial condition which may be produced by transforming the surface on the grains of the reactive filler into some other less active substance or by merely coating them. In practice, a combination of the two methods may be workable. The following example will serve as an illustration. Magnesia grain can be transformed on the surface into magnesium silicate and also coated with silicic acid by precipitation of silicic acid from silicate of soda or other silicic acid producing substances such as olivine. The grain thus treated and subsequently dried, when used in the cement, caused a decrease in the rate of set.

In order to get the full benefit from a cement it is necessary to control the grain size of any of its ingredients. It is evident that the particles should be uniform and preferably smaller than the threshold size where the filler becomes largely inactive in the afterset. Screening or air floating during or after grinding will produce the necessary fineness. It is of similar importance to control also the particle size of the aluminum phosphate. The rate at which the phosphate particles are dissolved will depend on the grain size and the ultimate properties of the hardened cement will largely depend on how rapidly and completely the phosphate dissolves while mixing with water. The grain size of the phosphate and its rate of dissolving could be used for the control of rate of set but this has proven impractical because the results are not too consistent and depend too much on the handling of the cement.

Examples of some compositions prepared according to this invention are listed below.

| Ingredients | Compositions of Cements in Parts by Weight | | | | | |
|---|---|---|---|---|---|---|
| | Ex. 1 | Ex. 2 | Ex. 3 | Ex. 4 | Ex. 5 | Ex. 6 |
| Periclase (MgO) | 10 | 10 | | | | |
| Olivine | 10 | 10 | 20 | 20 | 30 | |
| Talc or Serpentine | | | | | 10 | 20 |
| $Al_2O_3 \cdot 3H_2O$ (−200 mesh) | 10 | | | | | |
| Aluminum Phosphate ($Al_2O_3$ to $P_2O_5$ ratio 1.2 to 3 mols.) | 10 | 10 | 10 | 2.5 | 20 | 10 |
| Water | 1.5 | 1.5 | 2.5 | 2.5 | 8 | |

Examples 1 and 2, containing minus 200 mesh periclase, gave a very rapid set, good strength and good resistance to water. The Examples 3, 4, 5 and 6 gave a very slow set, the initial hardening occurred between 15 to 20 hours, and the afterset showed good progress within several days to one week. In this time, the specimen became more and more inert to water.

The properties of the aluminum phosphates vary with the $Al_2O_3$ to $P_2O_5$ ratio. For practical purposes, the range of 1 to 1.64 mols of $Al_2O_3$ to 3 mols of $P_2O_5$ is of principal interest. Adjustments and allowances must be made for the lower reactivity in the higher alumina ranges up to the di-aluminum phosphate, either by using a chemically very active filler or by causing an increased acidity and solubility by the addition of a solid organic acid in small quantities such as ½% of oxalic or tartaric acid, or by incorporation into the phosphate up to about 25% of aluminum or ammonium sulfate. Aluminum or ammonium sulfate may also be admixed with the cement as such in loose form. The sulfate radical is readily insolubilized during the setting of the cement by the presence of calcium or barium compounds.

These cements can be modified by inert fillers to enhance or correct properties or to produce new properties. By the addition of 25 to 35% of a suitable pigment, for instance, pigment grade rutile, a white paint may be produced.

Other modifications of the cement include the incorporation of ceramic types of fillers, such as for instance, clay, grog, kyanite, zircon, silica, feldspar, diatomaceous earth and the like. In a case of this kind it was also found practical to prepare the solid phosphate from a solution of the phosphate by mixing this with the filler, for instance finely powdered kyanite, then drying this at 220° F. and finally mixing the dried substance with the reactive filler.

Such a cement was prepared by mixing first equal parts by weight of a 50% solution of aluminum phosphate (mol. ratio 1.2 $Al_2O_3$ to 3 $P_2O_5$) with kyanite, drying at 220° F. and crushing. The powder then contained 2 parts of kyanite to one part of dry phosphate. The dry cement was then completed by the further addition of 2 parts of finely powdered olivine of relatively low iron content. This material reacted well, had a good workability and excellent adhesive qualities even to glassy surfaces. It had, further, very good strength and density.

From this specification, it will be seen that the cement herein described has a wide range of utility in the field of inorganic adhesives, paints, flooring, metal casting molds, closures or as a raw material in the manufacture of cast, pressed or otherwise molded products and in other fields.

I claim:

1. A dry cement mixture comprising components reactible upon admixture with water to form a chemical setting cement, said components consisting of water soluble aluminum phosphate ranging from mono- to di-aluminum phosphate and a magnesium compound from the group consisting of magnesia, olivine, magnesium silicate, and mixtures thereof, the ratio by weight of aluminum phosphate to the magnesium compound ranging from about 1:8 to 1:2.

2. A dry cement mixture comprising compositions reactible upon admixture with water to form a chemical setting cement, said compositions consisting of about 10-33% by weight of aluminum phosphates ranging from mono- to di-aluminum phosphate, and about 65-90% of a magnesium compound from the group consisting of magnesia, olivine, magnesium silicate, and mixtures thereof, and a filler.

3. A dry cement mixture comprising components reactible upon admixture with water to form a chemical setting cement, said components consisting of water soluble aluminum phosphate ranging from mono- to di-aluminum phosphate and olivine, the ratio by weight of aluminum phosphate to olivine ranging from about 1:8 to 1:2.

4. A dry cement mixture comprising components reactible upon admixture with water to form a chemical setting cement, said components consisting of water soluble aluminum phosphate ranging from mono- to di-aluminum phosphate and olivine, the ratio by weight of aluminum phosphate to magnesia ranging from about 1:8 to 1:2.

5. A dry cement mixture comprising components reactible upon admixture with water to form a chemical setting cement, said components consisting of water soluble aluminum phosphate ranging from mono- to di-aluminum phosphate, magnesia, and olivine, the ratio by weight of aluminum phosphate to the magnesia and olivine ranging from about 1:8 to 1:2.

HERBERT H. GREGER.

REFERENCES CITED

The following references are of record in the file of this patent:

UNITED STATES PATENTS

| Number | Name | Date |
| --- | --- | --- |
| 492,056 | Sichel | Feb. 21, 1893 |
| 692,197 | Gehre | Jan. 28, 1902 |
| 2,123,419 | Gundlach | July 12, 1938 |
| 2,222,199 | Fleck | Nov. 19, 1940 |

FOREIGN PATENTS

| Number | Country | Date |
| --- | --- | --- |
| 233,907 | Great Britain | 1925 |
| 326,825 | Great Britain | 1929 |